May 20, 1952   D. E. NOBLE   2,597,517
BUS PROGRESS CONTROL SYSTEM
Filed June 5, 1948   3 Sheets-Sheet 1
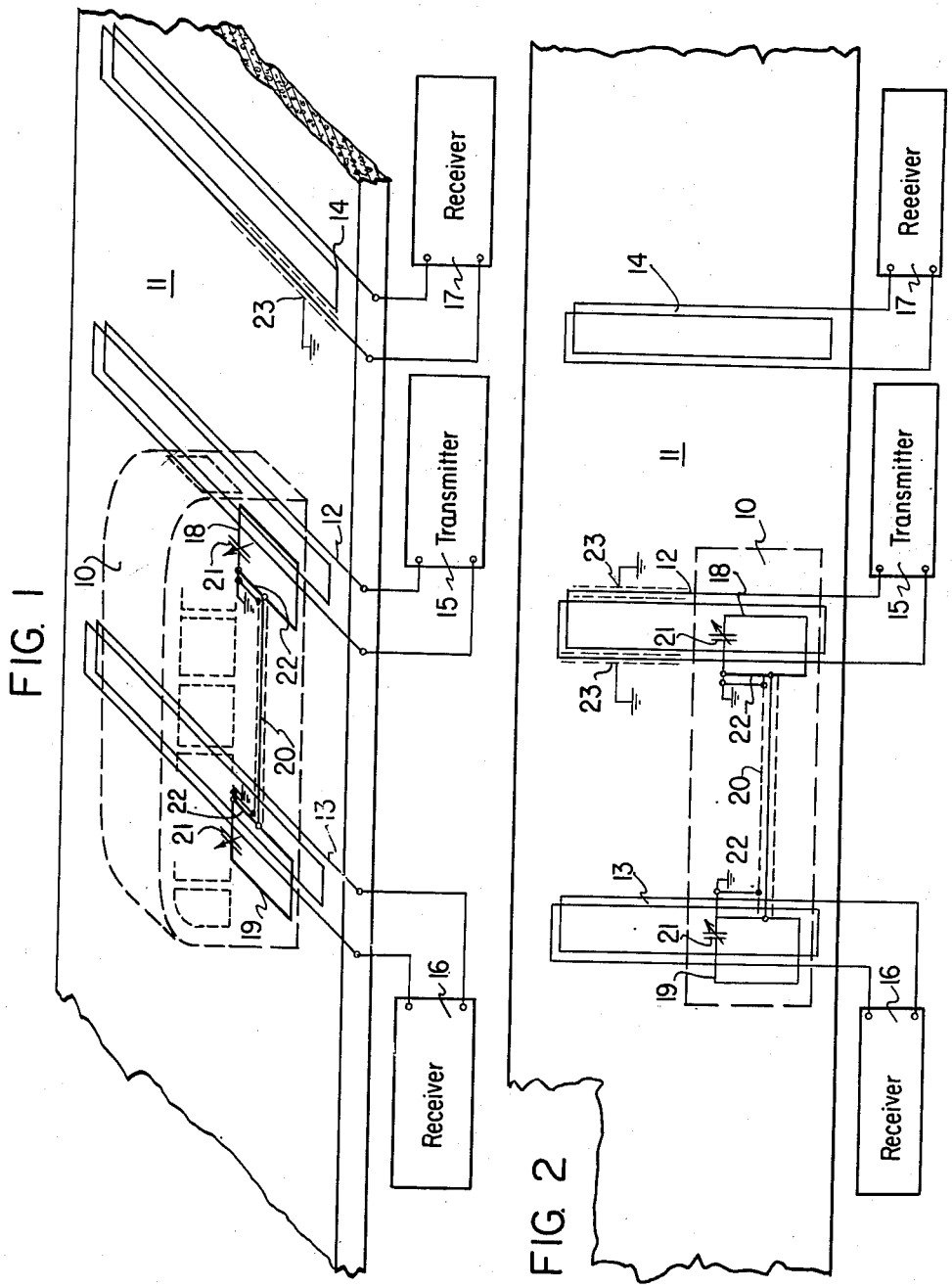
INVENTOR.
Daniel E. Noble
BY
Atty May 20, 1952 D. E. NOBLE 2,597,517
BUS PROGRESS CONTROL SYSTEM
Filed June 5, 1948 3 Sheets-Sheet 2
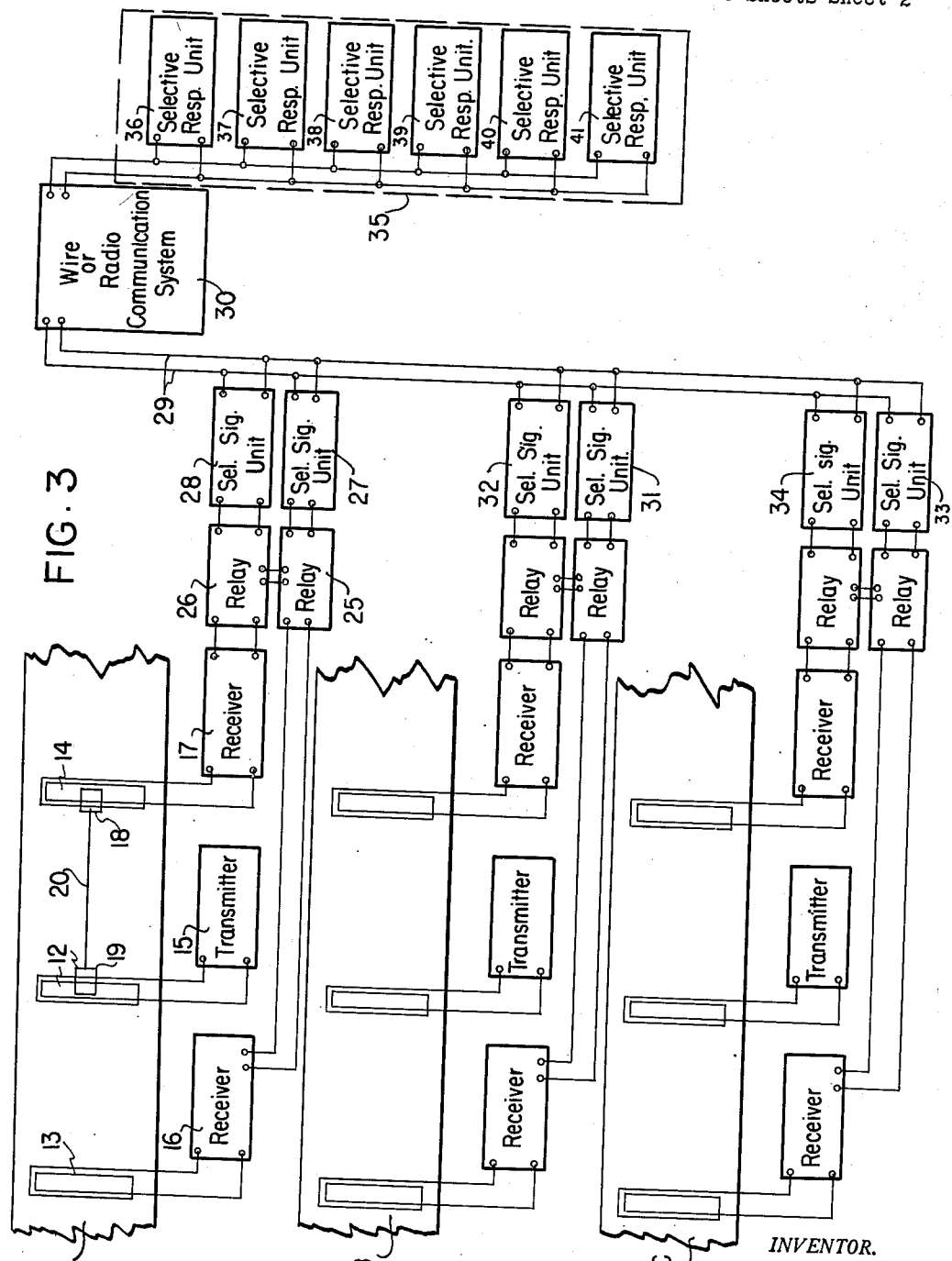
INVENTOR.
Daniel E. Noble
BY
Foorman L. Mueller
Atty.

May 20, 1952
D. E. NOBLE
2,597,517
BUS PROGRESS CONTROL SYSTEM
Filed June 5, 1948
3 Sheets-Sheet 3
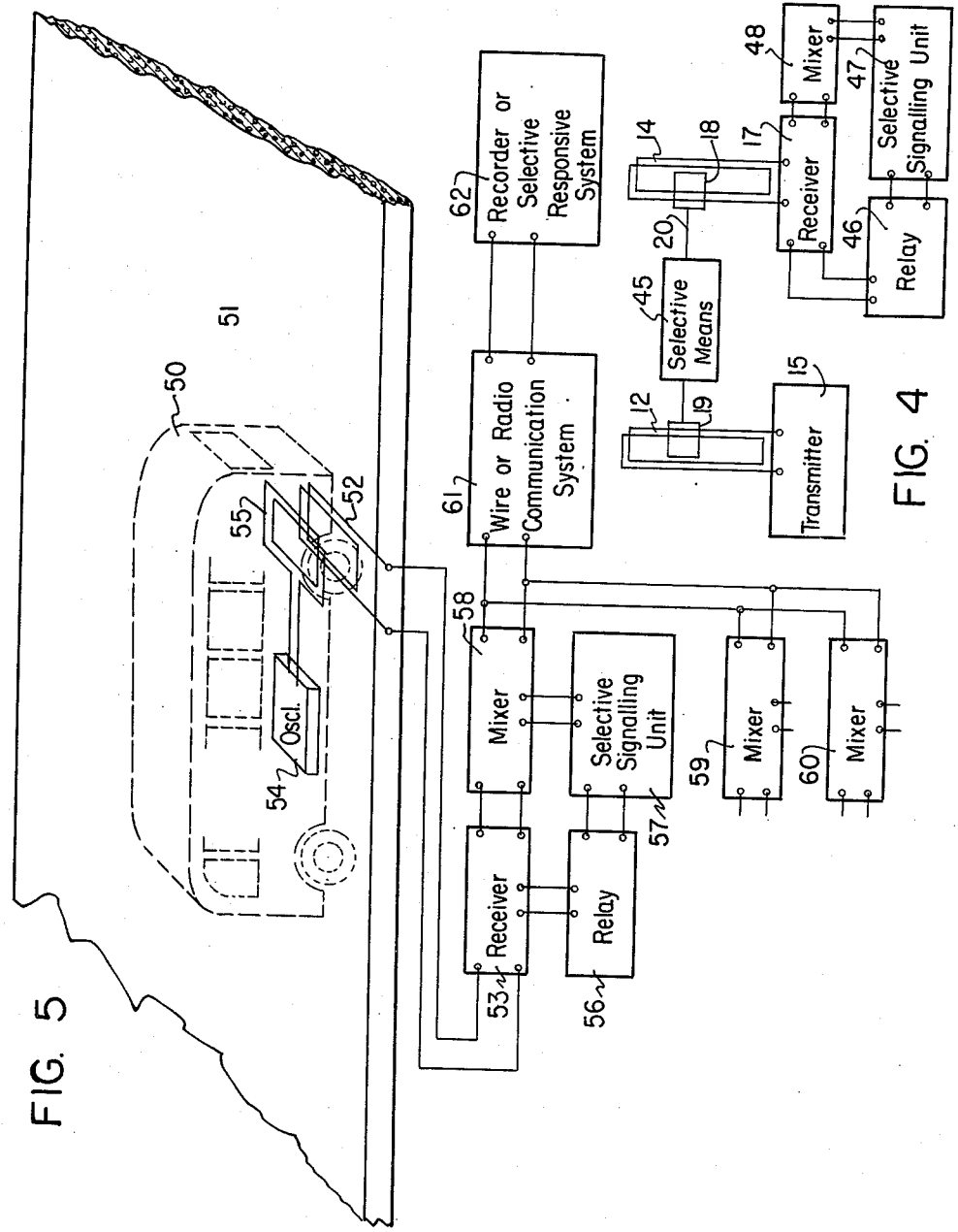
INVENTOR.
Daniel E. Noble
BY
Foorman L. Mueller
Atty.

Patented May 20, 1952

2,597,517

UNITED STATES PATENT OFFICE 2,597,517

BUS PROGRESS CONTROL SYSTEM

Daniel E. Noble, Elmhurst, Ill., assignor to Motorola, Inc., Chicago, Ill., a corporation of Illinois Application June 5, 1948, Serial No. 31,269

10 Claims. (Cl. 177—353)

This invention relates generally to systems for identifying moving objects and more particularly to a system for indicating the progress of a bus or other vehicle over a predetermined course.

Need has been indicated by public transportation companies, such as bus and street car companies, for a system which would indicate and/or record the progress of a bus or group of buses or other vehicles over a course or plurality of courses. Such a system would facilitate the preparing of schedules as the time required by the bus to traverse the various portions of a route under various conditions would be available. Also it would be possible for a central office to tell the location of the buses at all times and if desired the progress information could be recorded so that it could be available at a later date to establish the position of any bus at any given time. To provide the desired information it is necessary to identify the stations when a bus passes the same and also perhaps to identify the individual bus. In such a system it would be desirable that the equipment be simple and as easily maintained and operated as possible. Further, it is desired that a system operated over a single pair of wire lines or a single radio channel be capable of providing the complete information with reference to one course or route.

It is, therefore, an object of the present invention to provide a system for indicating when a particular movable object or the objects of a group reaches a predetermined point.

A further object of this invention is to provide a simple system for indicating at a remote point the progress of one or more movable objects along a predetermined course or courses.

Another object of this invention is to provide a system operable over a single communication channel for indicating the progress of each of a plurality of buses or other vehicles over the various portions of a route.

A feature of this invention is the provision of a system for indicating the progress of movable objects along a course including receivers positioned along a course and means on the objects for radiating signals so that the presence of an object is indicated by the reception of a signal by the receiver.

Another feature of this invention is the provision of stations along a course including receivers and associated selective signalling means, with the signalling means being operated when a signal is received by the associated receiver to produce a second signal which identifies the particular station.

Still another feature of this invention is the provision of a bus progress indicating system in which transmitters and receivers are installed at stations along the route and coupling means is carried by the bus so that when the bus is adjacent to a station the signal from the transmitter is applied to the receiver.

Still another feature of this invention is the provision of a system in which a transmitter and a pair of receivers are provided at each station with the receiver antennas being spaced on either side of the transmitter antennas so that the direction of movement of the bus which provides coupling between the transmitter and receivers can be detected.

Still another feature of this invention is the provision of selective means in the movable vehicle which imparts a particular characteristic to the signal radiated thereby which can be used for identifying the particular vehicle.

Further objects, features and advantages will be apparent from the following description taken in connection with the accompanying drawings in which:

Fig. 1 is a perspective view illustrating the system in accordance with the invention;

Fig. 2 is a top plan view of the system;

Fig. 3 is a block diagram indicating the coupling of a plurality of stations in a single system;

Fig. 4 illustrates a modification which can be included in the system of Figs. 1 to 3 inclusive; and Fig. 5 illustrates a modified system.

In practicing the invention there is provided a system for indicating the progress of moving vehicles such as buses or street cars over a course such as the usual bus or street car route. A plurality of stations may be provided along the route each including a transmitter and a pair of receivers having antennas positioned across the roadway traversed by the vehicles. The receiving antennas are spaced on either side of the transmitting antenna a distance substantially equal the length of the vehicle and coupling means are carried by the vehicles which include portions at either end of the vehicle so that coupling is provided from the transmitting antenna to the receiving antennas when the vehicles pass over the roadway adjacent the stations. By providing receivers on either side of the transmitter the direction of the bus can be indicated. The receivers may be connected to relays for operating selective signalling units so that signals identifying the particular stations are transmitted.

If it is desired to identify the particular vehicle, selective means may be provided in the coupling circuit for imparting a special characteristic to the signal. This signal may then be combined with the signal identifying the station to provide a combined signal which indicates both the vehicle and the station. The signals from a plurality of stations, which will then have different characteristics, can be transmitted over a single wire or radio channel to a remote central station and there the various signals can be separated and displayed or recorded as desired.

Modified systems may be provided in which signalling means are provided on the buses and only receivers are required at the stations. The presence of a signal in the receiver can again be used to actuate a device for providing a signal for identifying a station. If it is desired to identify the particular vehicle, the signal source in the vehicle may provide a signal of different characteristic for each vehicle and this signal can then be combined with the signal identifying the station so that a complex signal is provided which identifies both the vehicle and the station.

Referring now to the drawings, in Figs. 1 and 2 there is illustrated an identifying station with a bus shown in outline. The bus 10 is on the roadway 11 in which a plurality of coupling loops 12, 13 and 14 are provided. The coupling loops may be embedded in the roadway in any desired manner, it being necessary, however, that the loops be insulated from ground. The coupling loop 12 is connected to a transmitter 15 and the loops 13 and 14 are connected to receivers 16 and 17, respectively. The loops 12, 13 and 14 are preferably shielded as indicated at 23 but the shields must be broken by insulating sections so that short circuited turns are not provided. The transmitter will operate continuously to provide a signal which is radiated by the loop 12. The position of the loop 12 with respect to the loops 13 and 14 is of the order of the length of the vehicle to be identified. It is desired that the spacing be as great as possible to prevent transmission of the signal from the loop 12 to the loops 13 and 14 when a bus is not near the station. The bus 10 carries a pair of loops 18 and 19 which are spaced substantially the same distance as the loops 12 and 13 and coupled together by line 20. The loops 18 and 19 are closed loops having a condenser 21 for tuning the same. Low impedance coupling is provided by connecting the coaxial line 20 across a small portion 22 of each loop. By tuning the loops, the coupling provided thereby is much greater than any accidental coupling by buses or vehicles not provided with the coupling loops.

It will be apparent, therefore, that as the vehicle moves so that the loop 18 is positioned above the transmitting loop 12, the signal will be induced in the loop 18 and applied through transmission line 20 to the loop 19. The signal then will be radiated by the loop 19 and picked up by the loop 13 and thereby applied to the receiver 16. As the bus continues to the right, the coupling loop 18 will soon be positioned above the loop 14 and the loop 19 will be positioned above the loop 12. In this position signals radiated by loop 12 will be picked up by loop 19 and conducted to loop 18. The signal will then be radiated by loop 18 and picked up by loop 14 and connected to receiver 17. The receiver 17 will, therefore, receive the signal a short time after the receiver 16. The order in which signals are received by the receivers 16 and 17 will obviously indicate the direction of movement of the bus.

In tests which have been made, the transmitter 15 included a small low power crystal oscillator and a doubler amplifier. The transmitter operated at approximately 13 megacycles and was modulated with a 1000 cycle tone. The output of the transmitter was approximately ½ watt of modulated radio frequency energy and was applied to the transmitter loop which was tuned to 13 megacycles. The receiver loops were positioned about 20 feet from the transmitter loops and the receivers consisted of a condenser for resonating with the loop and a crystal rectifier for demodulating the signal. The output of the crystal rectifier was applied to an audio amplifier and the audio signal was rectified to provide a control signal. When using an audio amplifier with moderate gain, the signal level was increased by 5 to 1 when the bus was in a position in which the coupling loops were within two or three feet of the loops in the roadway. Therefore, a signal of greatly increased strength was received while the bus traversed a distance of four to six feet, providing sufficient length of time for operating the system. The signal level, of course, could be increased by providing greater audio amplification or by providing radio frequency amplification in the receiver.

Referring now to Fig. 3 there is illustrated a system in which signals from a plurality of stations can be transmitted over a single communication channel to a remote station. In this figure each of the stations A, B and C includes the same transmitter and receiver arrangement as illustrated in Figs. 1 and 2. At station A, the components are given the same reference numbers as in Figs. 1 and 2. In order to provide signals for identifying the particular stations, the outputs of the receivers 16 and 17 are applied to relays 25 and 26 respectively which are in turn coupled to selective signalling units 27 and 28. The relays may be arranged so that when signals of predetermined levels are applied thereto by the receivers, the relays will operate to energize the selective signalling units 27 and 28. The selective signalling units 27 and 28 may be any units which provide signals having different predetermined characteristics which can be thereafter identified and which are capable of simultaneous transmission over a single wire line. Systems such as disclosed in the Patent No. 2,547,027, issued April 3, 1951 to Marion R. Winkler and entitled "Vibrating Reed Controlled Oscillator" are highly satisfactory for this purpose.

The selective signalling units 27 and 28 may be connected by a single line 29 to a transmission system 30 by which the signals are transmitted to a remote point. Either wire or radio communication systems are suitable for this use. The relays 25 and 26 may be interlocked so that which ever relay is operated first will disable the other relay for a given length of time. Therefore, if a signal is first received by the receiver 16 and the selective signalling unit 27 is operated, as when the bus is travelling to the right, the signal later received by the receiver 17 will not operate the selective signalling unit 28. Therefore, only one signal will be provided as the bus passes a station, a signal being sent by the unit 27 when the bus moves to the right and a signal being sent by the unit 28 when the bus moves to the left. Alternatively the relays may be entirely independent and the two signals, therefore, sent in sequence. In this case the order in which the signals are received at the remote station will indicate the direction in which the bus moves.

The equipment at stations B and C may be identical to the equipment at station A with station B including selective signalling units 31 and 32 and station C including selective signalling units 33 and 34. All of the selective signalling units 27, 28, 31, 32, 33 and 34 are connected to the single wire line 29 and are then transmitted by a single communication channel. It is obvious, however, that if it is desired to use a radio system, a transmitter may be provided at each station and a single channel used for the different transmitters. The combined signals from the various stations may then be received at remote station 35 which includes a plurality of selective responsive units 36, 37, 38, 39, 40 and 41. The selective responsive units may be adapted to respond individually to the signals of the selective signalling units so that the bus progress information is available at the central office. The selective responsive units may preferably be of the construction disclosed in Patent No. 2,547,023 issued April 3, 1951 to Ralph J. Lense et al. entitled "Selective Calling System." The information may be displayed or recorded as desired. For example, the various signal responsive units could be connected to lights on a chart and thereby indicate when the bus reaches the positions represented by the lights. A recording system may also be used so that the signals could be later reproduced and/or displayed as desired. Although the system is disclosed as including three stations with six selective units to indicate two directions of movement at each station, it is obvious that a much more complicated system with a large number of stations could be provided to thereby provide complete information as to the progress of buses or other vehicles over a route.

The system of Fig. 3 can be simplified somewhat by modulating the transmitters of the stations A, B and C by signals of different frequencies so that the audio signals reproduced by the receivers themselves are different for each station. These signals could, therefore, be used directly without an intermediate selective signalling unit and the stations identified at the central station by the modulating signals. In such a system information as to the direction of movement of the bus could be provided by modulating the transmitters by two different tones and tuning each of the receivers for reception of only one of the tones.

In Fig. 4 there is illustrated means for identifying a particular bus in the system of Fig. 3. In this system selective means 45 is provided in the coaxial line 20 between the loops 18 and 19 carried by the vehicle. This selective means may be of any type which will impart a special characteristic to the signal which is radiated by the loop and applied to the receiver 17. For example, an interrupting means might be provided, with the interrupting means in the various buses being arranged to interrupt the signals at different frequencies. Alternatively, interrupting means which form a code can be used by working the codes differently to identify the various buses. The signal from receiver 17 would be used to operate relay 46 for energizing selective signalling unit 47 which provides a signal identifying the particular station. The signal identifying the station can then be combined in mixer 48 with the signal from the receiver 17 which identifies the bus to provide a complex signal.

In Fig. 5 there is illustrated a modified system in which only one receiver is required at the various stations and means for producing a signal such as an oscillator is provided in the vehicle. In this figure the bus is indicated by 50, and the roadway by 51. A receiving loop 52 is provided in the roadway which is connected to a receiver 53. An oscillator 54 is provided in the bus having an output loop 55 adapted to radiate a signal. It is apparent that when the loop 55 is adjacent the receiver loop 52, the energy from the oscillator 54 is applied to the receiver 53 to produce a signal therein. The oscillator 54 might be of construction similar to transmitter 15 and the receiver 53 may be generally similar to the receivers 16 and 17. In order to identify the individual buses on a route the various oscillators 54 may be modulated by different frequencies. The receiver 53 is coupled to a relay 56 which is adapted to operate when a signal of a predetermined level is applied thereto. This relay energizes selective signalling unit 57 which produces a signal for identifying the particular station. The signal from the selective unit may then be transmitted over a communication system to the remote station to indicate the arrival of a bus at the particular station. Alternatively, the signal from the selective unit could be combined with the signal from receiver 53 as by mixer 58 to thereby provide a combined signal which will identify both the particular bus 50 and the particular station. The mixers 59 and 60 may similarly provide combined signals for other stations not indicated. The signals from a plurality of stations may then be combined and transmitted over a single wire or radio communication system 61 and transmitted to a remote station 62 where the signals can be separated to provide the information required in the manner previously explained.

It is seen from the above that systems are provided for remotely indicating the presence of a movable object at a particular location and more particularly the progress of a bus or other vehicle over the various portions on a route or course. The system is effective to provide indications as to the direction of movement and to identify both the individual bus and the station. Signals can be provided from a plurality of stations over a single communication channel to thereby keep the cost of the system relatively low when using wire lines and do not consume a large frequency spectrum when using radio communication systems. In the system of Figs. 1 to 4 it is not necessary to provide expensive or critical equipment on the mobile vehicle to thereby reduce the cost of the equipment required, as well as the relatively high maintenance required for electronic equipment installed in mobile vehicles.

Although certain embodiments of my invention have been described, it is obvious that various changes and modifications can be made therein without departing from the intended scope of the invention as defined in the appended claims.

I claim:

1. A system for identifying the presence of a movable object at a particular location and the direction of movement of the object, comprising a signal radiating means positioned adjacent said location, a pair of signal receiving means positioned adjacent said location and spaced a given distance on either side of said signal radiating means, coupling means carried by said object including portions spaced by a distance substantially equal to said given distance for applying the signal from said transmitting means to said receiving means, and means coupled to said receiving means for producing a signal which indicates which receiving means first received the signal from said radiating means to thereby indicate the direction of movement of said object.

2. A system for identifying the presence of a movable object at a particular station and the direction of movement of the object, comprising a signal radiating means positioned adjacent said station, a pair of signal receiving means positioned adjacent said station and spaced a given distance on either side of said signal radiating means, coupling means carried by said object including portions spaced by a distance substantially equal to said given distance for picking up the signal from said transmitting means and radiating the same adjacent said receiving means, and selective signalling units associated with each of said receiver means for producing signals having different predetermined characteristics for identifying said receiver means, said selective signalling units being made operative when the signal received by the associated receiver reaches a predetermined level.

3. A system for identifying the presence of a movable object at a particular station and the direction of movement of the object, comprising a signal transmitter having an antenna positioned adjacent said station, a pair of signal receivers including antennas positioned adjacent said station and spaced a given distance on either side of said signal transmitting antenna, and coupling means carried by said object including loops spaced by a distance substantially equal to said given distance for picking up the signal from said transmitting antenna and reradiating the same adjacent said receiving antennas, selective signalling units associated with each of said receivers for producing signals having different predetermined characteristics for identifying said receivers, and means for energizing said selective signalling units when the signal received by the associated receiver reaches a predetermined level, said last named means being arranged so that when one of said selective signalling units is energized the other selective signalling unit is disabled for a time interval so that only one of said selective units produces a signal and the direction of movement of said object is indicated by the signal produced.

4. A system for identifying the presence of a movable object at a plurality of stations on a predetermined course comprising apparatus at each of said stations including a transmitter having an antenna positioned adjacent said course and a receiver having an antenna positioned adjacent said course and spaced from said transmitter antenna, a pair of coupled loops positioned on said object and having the same spacing as said antennas, so that as said object arrives at each of said stations one of said loops is adjacent said transmitter antenna and receives the signal therefrom and the other of said loops is adjacent said receiver antenna and reradiates said signal thereat, said apparatus including means for producing signals having particular characteristics for identifying the individual stations and means for combining the signals from said stations for transmission to a remote control point.

5. A system for identifying the progress of a movable vehicle over a predetermined course, comprising a plurality of stations each including a signal radiating means and a pair of signal receiving means spaced a given distance on either side of said signal radiating means, coupling means carried by said vehicle including tuned loops spaced by a distance substantially equal to said given distance for applying the signal from said transmitting means to said receiving means, selective signalling units associated with each of said receiver means for producing signals having different predetermined characteristics for identifying said individual receiver means, said selective signalling units being made operative when the signal received by the associated receiver reaches a predetermined level, means interconnecting said selective signalling units for disabling one unit when the other one is operated, and means for transmitting the signals from said selective signalling units to a remote point, with the signal transmitted indicating the position of the vehicle and the direction of movement thereof.

6. A system for identifying the presence of an elongated movable vehicle at a particular station on a roadway including in combination, transmitter means having an antenna positioned in said roadway, receiver means having an antenna positioned in said roadway and spaced from said transmitter antenna by a distance no greater than the length of said vehicle, a pair of tuned coupling loops carried by said vehicle with one of said loops being positioned adjacent the front of said vehicle and the other one of said loops positioned adjacent the rear thereof, and with said loops having the same spacing as said antennas so that as said vehicle traverses said roadway one of said loops is positioned over said transmitter antenna at the same time the other of said loops is positioned over said receiver antenna, and means interconnecting said loops so that a signal radiated by said transmitter means is applied through said coupled loops to said receiver means.

7. A system in accordance with claim 6 further including means associated with said receiver means for producing a signal having predetermined characteristics for identifying said station.

8. A system in accordance with claim 6 wherein said transmitter means includes means for producing signals having predetermined characteristics for identifying said station.

9. A system in accordance with claim 6 wherein said interconnecting means includes means for imparting a special characteristic to the signal applied therethrough for identifying said vehicle.

10. A system in accordance with claim 6 wherein said interconnecting means includes means for imparting a special characteristic to the signal applied therethrough and received by said receiver means for identifying said vehicle, and further including means associated with said receiver means for producing a signal having predetermined characteristics for identifying said station, and means for combining said signal from said receiver means and said signal from said associated means for providing a composite signal identifying both said vehicle and said station.

DANIEL E. NOBLE.

REFERENCES CITED

The following references are of record in the file of this patent:

UNITED STATES PATENTS

| Number | Name | Date |
|---|---|---|
| 1,797,864 | Harlandt | Mar. 24, 1931 |
| 1,983,342 | Chambers | Dec. 4, 1934 |
| 1,993,497 | Wells | Mar. 5, 1935 |
| 2,122,358 | Preston | June 28, 1938 |
| 2,243,341 | Horni | May 27, 1941 |
| 2,342,315 | Baughman | Feb. 22, 1944 |
| 2,379,800 | Hare | July 3, 1945 |
| 2,421,106 | Wight | May 27, 1947 |
| 2,480,160 | Poylo | Aug. 30, 1949 |
| 2,488,815 | Hailes | Nov. 22, 1949 |